United States Patent [19]

Sako et al.

[11] Patent Number: 4,577,005

[45] Date of Patent: Mar. 18, 1986

[54] POLYMERIC DIELECTRIC MATERIAL

[75] Inventors: Junichi Sako, Osaka; Toshiharu Yagi, Hyogo; Yoshihide Higashihata, Osaka; Masayoshi Tatemoto, Osaka; Nobuyuki Tomihashi, Osaka; Yoshiki Shimizu, Osaka, all of Japan

[73] Assignee: Daikin Kogyo Co., Ltd., Osaka, Japan

[21] Appl. No.: 620,006

[22] Filed: Jun. 12, 1984

[30] Foreign Application Priority Data

Jun. 20, 1983 [JP] Japan ............................... 58-111702

[51] Int. Cl.[4] ............................................ C08F 214/22

[52] U.S. Cl. ...................................... 526/254; 528/503

[58] Field of Search ......................... 526/254; 528/503

[56] References Cited

U.S. PATENT DOCUMENTS

| | | | |
|---|---|---|---|
| 3,790,540 | 2/1974 | Dohany et al. | 526/254 |
| 4,076,929 | 2/1978 | Dohany | 526/254 |

*Primary Examiner*—Harry Wong, Jr.

*Attorney, Agent, or Firm*—Birch, Stewart, Kolasch & Birch

[57] ABSTRACT

A polymeric dielectric material comprising a terpolymer which comprises 30 to 90% by mole of VdF, 5 to 70% by mole of TrFE and 0.1 to 20% by mole of HFP, having large permittivity, which is improved by heat treatment.

6 Claims, No Drawings

POLYMERIC DIELECTRIC MATERIAL

FIELD OF THE INVENTION

The present invention relates to a polymeric dielectric material. Particularly, it relates to a polymeric dielectric material comprising a vinylidene fluoride (hereinafter referred to as "VdF")/trifluoroethylene (hereinafter referred to as "TrFE")/hexafluoropropylene (hereinafter referred to as "HFP") terpolymer.

BACKGROUND OF THE INVENTION

Electronic devices are required to be smaller and thus a capacitor as an element of the electronic devices must be made smaller.

Capacity of a capacitor is calculated according to the following equation:

$$C=\epsilon'\epsilon_0(S/d)$$

wherein $\epsilon'$ is specific permittivity of a dielectric material, $\epsilon_0$ is specific permittivity of vacuum (0.0885 pF/cm), S is a surface area of the capacitor and d is a thickness of the capacitor. As is clear from the above equation, $\epsilon'$ and S must be made large and d must be made small in order to obtain the capacitor having smaller size and larger capacity.

Although the polymeric material is easily made in the form of a thin film having a large area, its specific permittivity is as small as 2 to 5. In order to produce a small capacitor having high performance, a dielectric polymeric material having large specific permittivity is required. The copolymer of VdF and TrFE is known as a highly dielectric polymeric material (cf. U.S. Pat. No. 4,173,033). The specific permittivity of the VdF/TrFE copolymer is about 15 (at a room temmperature and 1 KHz), which is 1.5 to 2.0 times larger than that of PVdF which has been known as a good polymeric dielectric material.

As a result of the extensive study on the dielectric properties of fluoropolymers, particularly VdF/TrFE copolymers, it has now been found that a VdF/TrFE/HFP terpolymer has excellent dielectric properties.

SUMMARY OF THE INVENTION

According to the present invention, there is provided a polymeric dielectric material comprising a terpolymer which comprises 30 to 90% by mole of VdF, 5 to 70% by mole of TrFE and 0.1 to 20% by mole of HFP.

The terpolymer to be used according to the invention comprises VdF, TrFE and further HFP and has a better permittivity than a conventional VdF/TrFE copolymer and good resistivity.

DETAILED DESCRIPTION OF THE INVENTION

The terpolymer of the invention comprises VdF, TrFe and HFP in the above monomeric composition. When the content of HFP is more than the upper limit, the terpolymer loses its crystallinity and its dielectric properties are not effectively improved by heat treatment which will be explained below. A more preferred terpolymer comprises 35 to 80% by mole of VdF, 15 to 60% by mole of TrFE and 0.5 to 15% by mole of HFP.

The terpolymer of the invention may further comprises a small amount of at least one other copolymerizable monomer as a modifier. Specific examples of the modifier are fluoroolefins (eg. tetrafluoroethylene, vinyl fluoride, etc.).

The terpolymer of the invention may be prepared by a conventional polymerization method.

The terpolymer of the invention can be dissolved in a polar solvent such as dimethyl formamide, dimethylacetamide, methyl ethyl ketone, acetone, etc and casted in the form of a film.

Since the conventional VdF/TrFE copolymer containing 75% by mole or more of VdF is not dissolved in easily and widely available ketones, it cannot be formed in the form of a film from its solution in ketones, which is one of its drawbacks. According to the present invention, the terpolymer is dissloved in various kinds of polar solvents including ketones even at a room temperature and is casted.

In addition to casting, the terpolymer of the invention can be heat pressed, calender rolled or extruded in the form of a film.

The dielectric properties of the polymeric dielectric material of the invention can be improved by heat treatment. For example, when it is heated at a temperature of from 60° to 140° C. for at least one hour, preferably for 1 to 1.5 hours. its permittivity is increased by 120 to 170%, namely by 3 to 7 in permittivity.

The capacitor may be produced by vacuum metallizing metal (eg. aluminum, copper, nickel, etc.) on both surfaces of the terpolymer film to form electrodes. The thickness of the metal layer may be 0.05 to 2 micrometers. Alternatively, the electrodes may be formed by laminating metal foils on both surfaces of the film.

PREFERRED EXAMPLES OF THE INVENTION

The present invention will be hereinafter explained further in detail by following Examples.

EXAMPLE 1 AND COMPARATIVE EXAMPLE 1

In a 1,000 ml autoclave equipped with a stirrer, ion-exchanged water (350 ml) was charged and closed. The interior was thoroughly replaced with nitrogen to remove oxygen. Then, trichlorotrifluoroethane (180 ml) and HFP (20 g) were charged and stirred thoroughly at 20° C. Thereafter, a gaseous mixture of VdF and TrFE in a molar ratio of 1:1 was injected to pressurize to 6.0 $Kg/cm^2$ G. The reaction was initiated by the addition of $[HCF_2(CF_2)_5COO]_2$ – (2.4 g). During the reaction, the gaseous mixture was injected to keep the pressure constant (6.0 $Kg/cm^2$ G). After continuing the reaction for two hours, the unreacted monomers were removed and the reaction mixture was recovered, washed with water and dried to obtain white terpolymer (50 g). The monomeric composition of the terpolymer was calculated from the results of $H^1$-NMR and $F^{19}$-NMR. Monomeric composition, VdF:TrFE:HFP=50.4:47.1:2.5 (by mole). Intrinsic viscosity (in methyl ethyl ketone at 35° C.), 1.39. M.P., 135° C.

The thus obtained terpolymer was dissolved in methyl ethyl ketone in a concentration of 10% by weight and casted on a glass plate to form a film of 60 to 70 micrometers in thickness. On both surfaces of the film, aluminum was vacuum metallized. The permittivity was 14.2 at a room temperature and 1 KHz (Sample No. (2)).

Some terpolymers were prepared with varying their monomeric compositions. Their permittivities are shown in Table 1.

As a comparative example, a VdF/TrFE copolymer having the same molar ratio of VdF and TrFE was prepared. Its permittivity is also shown in Table 1.

TABLE 1

| | Monomeric composition (% by mole) | | | Permit- | M.P. | Intrinsic |
|---|---|---|---|---|---|---|
| | VdF | TrFE | HFP | tivity | (°C.) | viscosity |
| Example 1 (1) | 50.8 | 48.9 | 0.3 | 11.6 | 153 | 1.35 |
| Example 1 (2) | 50.4 | 47.1 | 2.5 | 14.2 | 135 | 1.39 |
| Example 1 (3) | 48.2 | 45.4 | 6.4 | 16.9 | 110 | 1.33 |
| Example 1 (4) | 47.1 | 44.9 | 8.0 | 16.8 | 91 | 1.24 |
| Example 1 (5) | 45.8 | 43.0 | 11.2 | 16.5 | — | 1.22 |
| Comparative Example 1 | 50.3 | 49.7 | 0 | 10.0 | — | — |

EXAMPLE 2 AND COMPARATIVE EXAMPLE 2

The films prepared in Example 1 and Comparative Example 1 were heat treated at 135° C. for one hour. The permittivity of the heat treated films were shown in Table 2.

TABLE 2

| | Polymer | Permittivity |
|---|---|---|
| Example 2 (1) | Example 1 (1) | 18.2 |
| Example 2 (2) | Example 1 (2) | 20.0 |
| Example 2 (3) | Example 1 (3) | 20.0 |
| Example 2 (4) | Example 1 (4) | 19.8 |
| Comparative Example 2 | Comparative Example 1 | 17.2 |

EXAMPLE 3 AND COMPARATIVE EXAMPLE 3

In the same manner as in Example 1 or Comparative Example 1 but using VdF and TrFE in a molar ratio of 3:1, polymers were prepared. Their permittivities are shown in Table 3.

TABLE 3

| | Monomeric composition (% by mole) | | | Permit- | M.P. | Intrinsic |
|---|---|---|---|---|---|---|
| | VdF | TrFE | HFP | tivity | (°C.) | viscosity |
| Example 3 (1) | 74.9 | 24.0 | 1.1 | 9.8 | 137 | 1.40 |
| Example 3 (2) | 74.4 | 23.4 | 2.2 | 9.9 | 125 | 1.25 |
| Example 3 (3) | 71.8 | 23.5 | 4.7 | 12.0 | 104 | 1.01 |
| Comparative Example 3 | 74.7 | 25.3 | 0 | 9.0 | 148 | 133 |

EXAMPLE 4 AND COMPARATIVE EXAMPLE 4

The films prepared in Example 3 and Comparative Example 3 were heat treated at 135° C. for one hour. The permittivity of the heat treated films were shown in Table 4.

TABLE 4

| | Polymer | Permittivity |
|---|---|---|
| Example 4 (1) | Example 3 (1) | 13.5 |
| Example 4 (2) | Example 3 (2) | 15.0 |
| Comparative Example 4 | Comparative Example 3 | 11.5 |

What is claimed is:

1. A polymeric dielectric material film comprising a terpolymer which comprises 35 to 80% by mole of vinylidene fluoride, 15 to 60% by mole of trifluoroethylene and 0.5 to 11.2% by mole of hexafluoropropylene, said film having a permittivity of at least about 9.8 such that the permittivity is increased by 3 to 7 when said film is heated at a temperature of from 60° to 140° C. for at least one hour.

2. A polymeric dielectric material according to claim 1, wherein the terpolymer is heat treated.

3. A polymeric dielectric material according to claim 2, wherein the terpolymer is heat treated at a temperature of 60° to 140° C. for at least one hour.

4. A polymeric dielectric material film according to claim 1, wherein said vinylidene fluoride and trifluoroethylene are contained in a molar ratio of about 3:1.

5. A polymeric dielectric material comprising a terpolymer which comprises 35 to 80% by mole of vinylidene fluoride, 15 to 60% by mole of trifluoroethylene and 0.3 to 11.2% by mole of hexafluoropropylene, said vinylidene fluoride and trifluoroethylene being contained in a molar ratio of about 3:1, said film having a permittivity of at least about 9.8 such that the permittivity is increased by 3 to 7 when said film is heated at a temperature of from 60° to 140° C. for at least one hour.

6. A polymeric dielectric material according to claim 5, wherein the terpolymer is heat treated at a temperature of 60° to 140° C. for at least one hour.

* * * * *